US008886452B2

(12) United States Patent
Takahashi

(10) Patent No.: US 8,886,452 B2
(45) Date of Patent: Nov. 11, 2014

(54) MOBILE TERMINAL, SYSTEM AND METHOD

(75) Inventor: Makoto Takahashi, Chiyoda-ku (JP)

(73) Assignee: NTT DoCoMo, Inc., Tokyo (JP)

( * ) Notice: Subject to any disclaimer, the term of this patent is extended or adjusted under 35 U.S.C. 154(b) by 56 days.

(21) Appl. No.: 13/880,086

(22) PCT Filed: Nov. 28, 2011

(86) PCT No.: PCT/JP2011/077406
§ 371 (c)(1),
(2), (4) Date: Apr. 18, 2013

(87) PCT Pub. No.: WO2012/073895
PCT Pub. Date: Jun. 7, 2012

(65) Prior Publication Data
US 2013/0211708 A1    Aug. 15, 2013

(30) Foreign Application Priority Data

Dec. 2, 2010 (JP) .................................. 2010-269608

(51) Int. Cl.
*G01C 21/00* (2006.01)
*G01C 21/20* (2006.01)

(52) U.S. Cl.
CPC .............. *G01C 21/00* (2013.01); *G01C 21/206* (2013.01)
USPC .............................................. 701/411; 701/1

(58) Field of Classification Search
CPC .................. G08G 1/096827; G08G 1/096872; G01C 21/3415; G01C 21/3461; G01C 21/3492
USPC ..................................................... 701/1, 411
See application file for complete search history.

(56) References Cited

U.S. PATENT DOCUMENTS 4,893,246 A    1/1990 Iihoshi et al.
6,249,740 B1   6/2001 Ito et al.
(Continued)

FOREIGN PATENT DOCUMENTS

JP    63 150618    6/1988
JP    2000 113388  4/2000
(Continued)

OTHER PUBLICATIONS

International Search Report Issued Feb. 28, 2012 in PCT/JP11/077406 Filed Nov. 28, 2011.

*Primary Examiner* — Ian Jen
(74) *Attorney, Agent, or Firm* — Oblon, Spivak, McClelland, Maier & Neustadt, L.L.P.

(57) ABSTRACT

One aspect of the present invention relates to a mobile terminal having an autonomous navigation function, including an anchor management unit configured to acquire a directional change point, set the acquired directional change point as an anchor point and store the anchor point, wherein the directional change point is assumed for a user to change direction on a route from a departure point to a destination point of the user of the mobile terminal on map information, a measurement unit configured to detect movement of the mobile terminal and provide sensor information indicative of the movement, a position calculation unit configured to calculate a current position of the mobile terminal based on the sensor information, a rotation detection unit configured to detect rotation of the user based on the sensor information and determine a rotation point associated with the detected rotation and a current position correction unit configured to determine an anchor point corresponding to the determined rotation point from the anchor points stored in the anchor management unit and correct the current position of the mobile terminal with a position of the determined anchor point.

10 Claims, 6 Drawing Sheets

(56) References Cited

U.S. PATENT DOCUMENTS

2008/0281512 A1* 11/2008 Wipplinger et al. .......... 701/208
2009/0082666 A1* 3/2009 Geist et al. ................... 600/424
2009/0141591 A1* 6/2009 Basilico ........................ 367/128
2010/0245174 A1 9/2010 Okuyama et al.
2013/0211708 A1* 8/2013 Takahashi .................... 701/411

FOREIGN PATENT DOCUMENTS

| JP | 2008 20307 | 1/2008 |
| JP | 2009 75036 | 4/2009 |
| JP | 2010 122034 | 6/2010 |
| JP | 2010 223829 | 10/2010 |

* cited by examiner

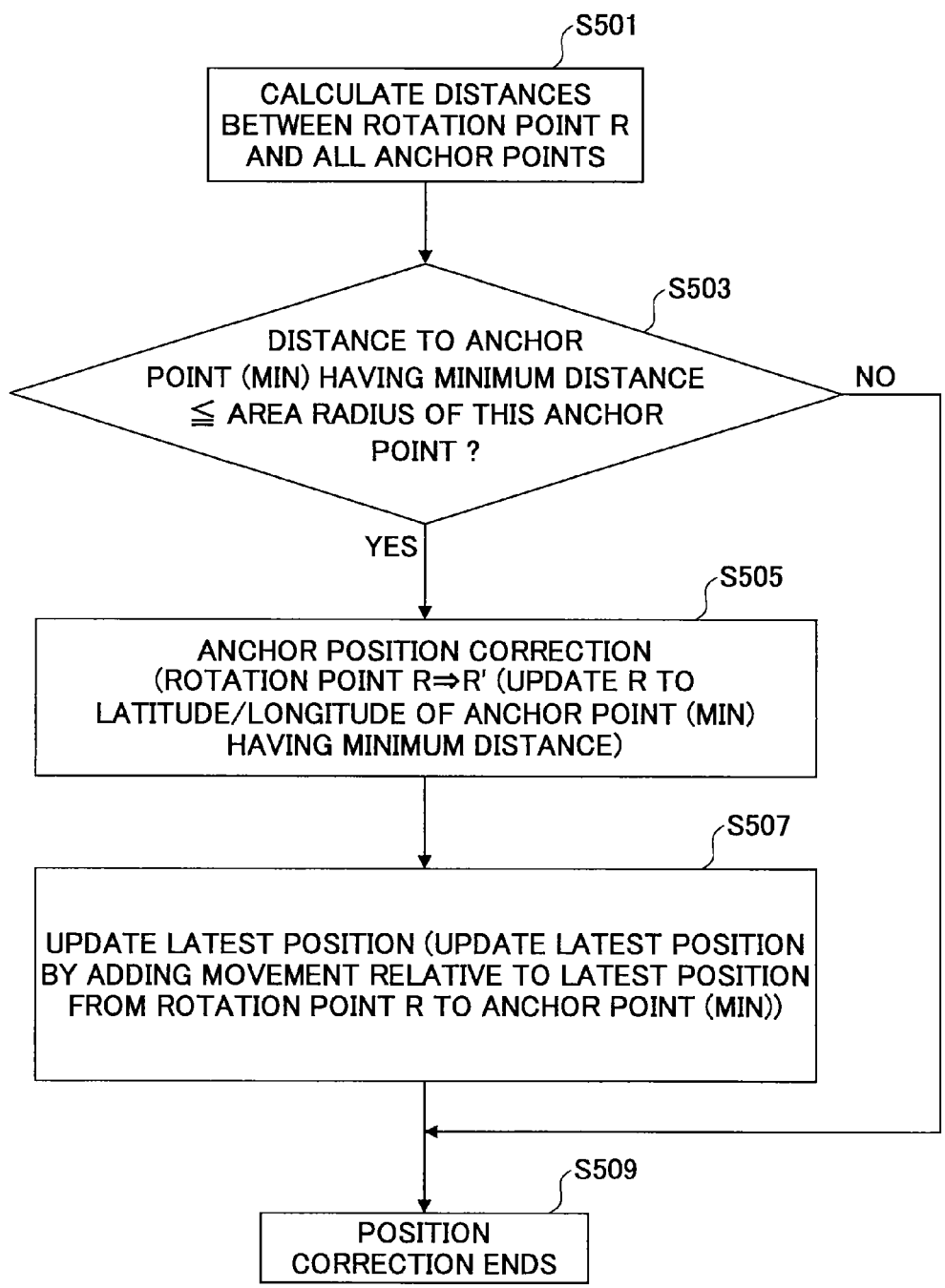

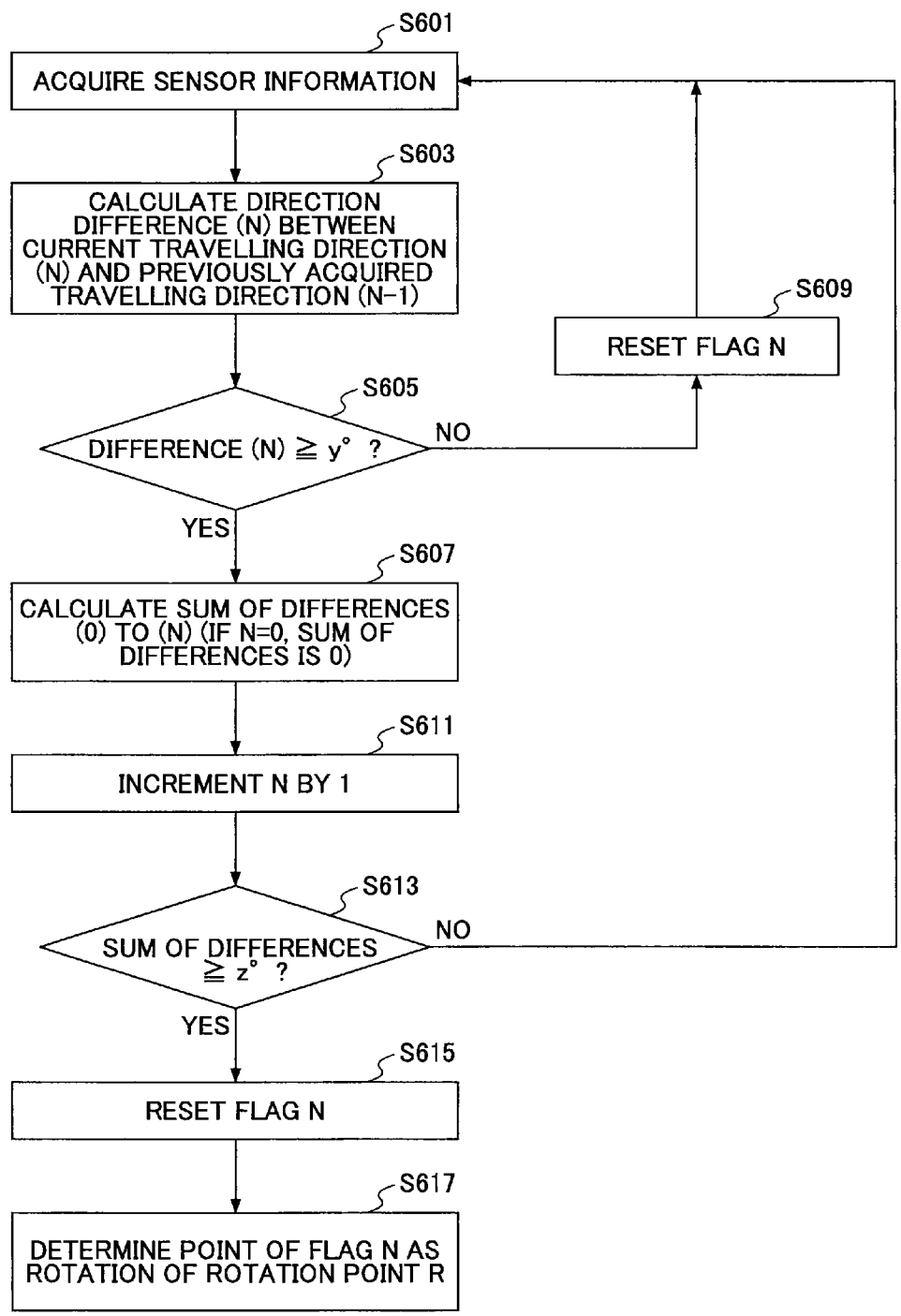

MOBILE TERMINAL, SYSTEM AND METHOD

TECHNICAL FIELD

The present invention relates to a mobile terminal having an autonomous navigation function.

BACKGROUND ART

Recently, development of positional information services in indoor environments is expected due to improvement of accuracy of positioning techniques using base stations and emergence of new positioning techniques such as a WLAN (Wireless Local Area Network) positioning technique for mobile terminals.

As one of the new indoor positioning techniques, attention to an autonomous navigation technique using various sensor information items from an accelerometer sensor, a geomagnetic sensor and others has been drawn. However, there is a problem that errors of measurement using only sensors may be accumulated, and it is important to perform positional correction periodically by using information items other than the sensor information items so as to improve the accuracy. For example, see JP 2010-223829 and JP 2010-122034.

SUMMARY OF INVENTION

Problem to be Solved by the Invention

In a conventional autonomous navigation targeted to mobile terminals, an accelerometer sensor, a geomagnetic sensor, a gyro sensor and others are used to measure the position of the mobile terminals by estimating an amount of movement from an initial position and calculating positional coordinates.

However, errors of the estimated positional coordinates are accumulated, and as the mobile terminal approaches a destination point, deviation from an actual route is compounded, which may make it more difficult to navigate the mobile terminal to the destination point correctly.

In conjunction with the above problem, one object of the present invention is to provide a mobile terminal, a system and a method that perform positional correction at each point on a route to eliminate the accumulation of measurement errors in the mobile terminal having an autonomous navigation function.

Means for Solving the Problem

In order to overcome the above problem, one aspect of the present invention relates to a mobile terminal having an autonomous navigation function, including an anchor management unit configured to acquire a directional change point, set the acquired directional change point as an anchor point and store the anchor point, wherein the directional change point is assumed for a user to change direction on a route from a departure point to a destination point of the user of the mobile terminal on map information, a measurement unit configured to detect movement of the mobile terminal and provide sensor information indicative of the movement, a position calculation unit configured to calculate a current position of the mobile terminal based on the sensor information, a rotation detection unit configured to detect rotation of the user based on the sensor information and determine a rotation point associated with the detected rotation and a current position correction unit configured to determine an anchor point corresponding to the determined rotation point from the anchor points stored in the anchor management unit and correct the current position of the mobile terminal with a position of the determined anchor point.

Another aspect of the present invention relates to a system including a mobile terminal having an autonomous navigation function and a server communicatively connected to the mobile terminal, the server including a route determination unit configured to, upon receiving data indicative of a departure point and a destination point of a user of the mobile terminal, determine a route from the departure point to the destination point with reference to map information and an anchor point determination unit configured to extract a directional change point and transmit the extracted directional change point to the mobile terminal, wherein the directional change point is assumed for a user to change direction on the determined route, the mobile terminal including an anchor management unit configured to set and store the received directional change point as an anchor point, a measurement unit configured to detect movement of the mobile terminal and provide sensor information indicative of the movement, a position calculation unit configured to calculate a current position of the mobile terminal based on the sensor information, a rotation detection unit configured to detect rotation of the user based on the sensor information and determine a rotation point of the detected rotation and a current position correction unit configured to determine an anchor point corresponding to the determined rotation point from the anchor points stored in the anchor management unit and correct the current position of the mobile terminal with a position of the determined anchor point.

A further aspect of the present invention relates to a method for use in a mobile terminal having an autonomous navigation function, including acquiring a directional change point, setting the acquired directional change point as an anchor point and storing the anchor point, wherein the directional change point is assumed for a user to change direction on a route from a departure point to a destination point of the user of the mobile terminal on map information, detecting movement of the mobile terminal and providing sensor information indicative of the movement, calculating a current position of the mobile terminal based on the sensor information, detecting rotation of the user based on the sensor information and determining a rotation point associated with the detected rotation and determining an anchor point corresponding to the determined rotation point from the stored anchor points and correcting the current position of the mobile terminal with a position of the determined anchor point.

Advantage of the Invention

According to the present invention, it is possible to provide a mobile terminal, a system and a method that perform positional correction at each point on a route to eliminate the accumulation of measurement errors in the mobile terminal having an autonomous navigation function.

BRIEF DESCRIPTION OF DRAWINGS

FIG. 5 is a flowchart illustrating an anchor position correction operation according to one embodiment of the present invention; and FIG. 6 is a flowchart illustrating a rotation detection operation according to another embodiment of the present invention.

EMBODIMENTS FOR CARRYING OUT THE INVENTION

Embodiments of the present invention are described below with reference to the drawings.

A mobile terminal according to embodiments of the present invention sets directional change points, where a user is assumed to change the direction on a setup route from a departure point to a destination point, as anchor points and performs positional correction for the mobile terminal at each of the anchor points in order to reduce accumulation of measurement errors and improve measurement accuracy of autonomous navigation.

Initially, an arrangement of a mobile terminal according to one embodiment of the present invention is described with reference to FIG. 1.

A mobile terminal according to this embodiment is typically a portable information terminal, such as a cellular phone terminal or a smart phone, that can acquire position of the mobile terminal by means of an application installed in the mobile terminal or information from an external device that can communicate via a network (not shown). Typically, the mobile terminal consists of one or more various hardware resources such as an auxiliary storage device, a memory device, a CPU, a communication device, a display device, an input device and a measurement device. The auxiliary storage device consists of a hard disk, a flash memory or others and stores programs or data for implementing various operations as stated below. The memory device consists of a RAM (Random Access Memory) or others and in response to receipt of an instruction to start the programs, reads the programs from the auxiliary storage device and loads the programs therein. The CPU serves as a processor for processing information and implements various functions as stated below in accordance with the programs stored in the memory device. The communication device consists of various communication circuits for wired and/or wireless connections with other devices such as a server via a network. The communication device according to this embodiment further includes a reception circuit for implementing a GPS (Global Positioning System) function. The display device consists of a display or others and displays contents received via the network or a GUI (Graphical User Interface) in accordance with programs. The input device typically consists of operation buttons, a keyboard, a mouse or others and is used for a user of the mobile terminal to input various manipulation commands. The measurement device consists of various sensors, such as an accelerometer sensor, a geomagnetic sensor and a gyro sensor, to measure movement of the mobile terminal for implementing the autonomous navigation function. Note that the mobile terminal of the present invention is not limited to the above hardware arrangement and may include any other appropriate hardware arrangement such as circuits or others for implementing various functions as stated below.

Figure 1:
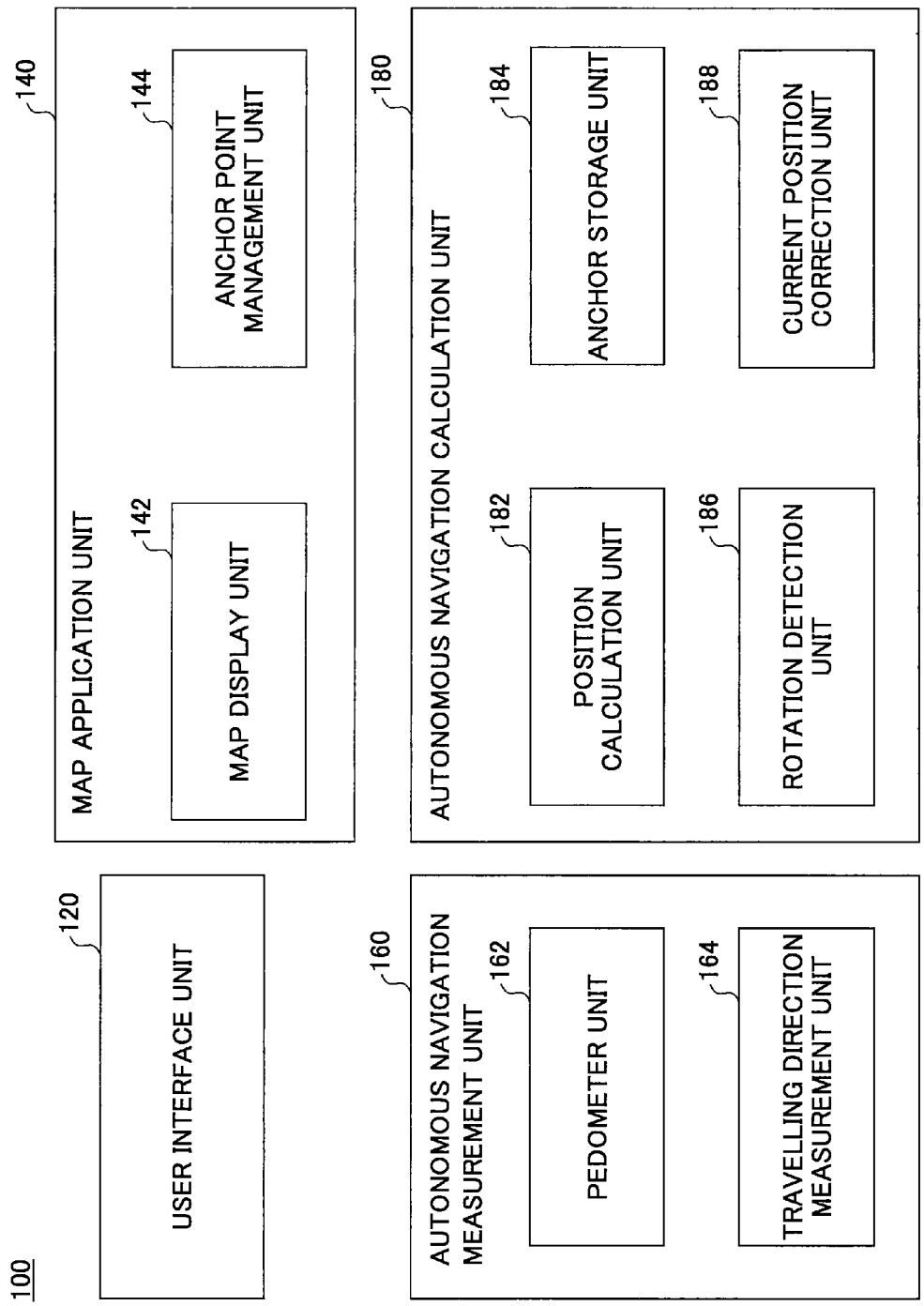
FIG. 1 illustrates an exemplary functional arrangement of a mobile terminal according to one embodiment of the present invention.

FIG. 1 illustrates an exemplary function arrangement of a mobile terminal according to one embodiment of the present invention. In FIG. 1, a mobile terminal 100 includes a user interface unit 120, a map application unit 140, an autonomous navigation measurement unit 160 and an autonomous navigation calculation unit 180.

When a user inputs a departure point and a destination point via the input device, the user interface unit 120 provides the map application unit 140 with positional information on the supplied departure and destination points. Typically, the departure point is a current position, and the positional information on the current position acquired by means of the GPS function in the mobile terminal 100 may be supplied to the map application unit 140. Also, the destination point may be an address of the user's input destination point, a point specified on map information displayed by the map application unit 140, or a building, a facility or a store specified via other applications, and the positional information derived from the specified position may be supplied to the map application unit 140.

Upon receiving the positional information regarding the departure and destination points from the user interface unit 120, the map application unit 140 sets a route from the specified departure point to the specified destination point and also extracts and manages anchor points on the setup route. According to this embodiment, directional change points assumed for the user to change the direction on the setup route, that is, turning areas or corners, are extracted as the anchor points.

As illustrated in FIG. 1, the map application unit 140 includes a map display unit 142 and an anchor point management unit 144.

The map display unit 142 sets a route from the departure point to the destination point based on the positional information on the departure and destination points supplied from the user interface unit 120 and provides the anchor point management unit 144 with the setup route. The setting of a route may be performed by determining the shortest route from the departure point to the destination point by using any appropriate navigation algorithm with reference to the map information stored in the map application unit 140. Typically, the shortest route from the departure point to the destination point is selected. However, the setting of a route is not limited to it and may be performed in any appropriate manner. Upon setting the route from the departure point to the destination point, the map display unit 142 generates map data for display in order to display the setup route to the user. If there are several candidate routes from the departure point to the destination point, the map display unit 142 may generate map data for display for one route selected from the several routes as the route for display and provide the anchor point management unit 144 with the other routes as candidate routes, although the map display unit 142 does not generate map data for display for the other routes. In this manner, even if the user actually walks in a route different from the setup route, flexible positional correction can be made by using anchor points of the candidate routes.

Upon receiving the setup route from the map display unit 142, the anchor point management unit 144 extracts turning points assumed for the user to change the direction on the setup route with reference to the map information stored in the map application unit 140 and sets the extracted turning points as the anchor points. Specifically, the anchor point management unit 144 extracts points associated with directional changes greater than or equal to a predefined angle (for example, 90 degree) on the setup route in the map information and sets the extracted points as anchor points. Then, the anchor point management unit 144 manages positional information such as latitude and longitude corresponding to the extracted points in association with the anchor points. Positional correction for the mobile terminal 100 by the anchor points is performed by correcting the position of the mobile terminal 100 with an anchor point near a change point where the mobile terminal 100 changes the travelling direction. To this end, for each anchor point, the anchor point management unit 144 sets an anchor area as a neighboring area of that position. The anchor point management unit 144 provides the autonomous navigation calculation unit 180 with the setup anchor points and anchor areas as anchor information. If the anchor point management unit 144 receives the setup route as well as one or more candidate routes, the anchor point management unit 144 may analogously generate the anchor information for the candidate routes and provide the autonomous navigation calculation unit 180 with the generated anchor information. Specific operations for the anchor point setup operation by the anchor point management unit 144 are described with reference to FIG. 3 in detail below.

In this embodiment, the map application unit 140 is installed within the mobile terminal 100, but the present invention is not limited to it. In another embodiment, the map application unit 140 maybe installed in an external server that can communicate with the mobile terminal 100. In other words, when the user interface unit 120 sends the server the positional information regarding user's incoming departure and destination points, the server may perform the above-stated operations, determine the anchor point and the anchor area and return the anchor point and the anchor area as the anchor information to the mobile terminal 100.

The autonomous navigation measurement unit 160 measures various data regarding movement of the mobile terminal 100 and provides the autonomous navigation calculation unit 180 with the measured data as sensor information. As illustrated in FIG. 1, the autonomous calculation measurement unit 160 includes a pedometer unit 162 and a travelling direction measurement unit 164.

The pedometer unit 162 monitors walking of a user carrying the mobile terminal 100 and measures the number of steps the user has taken. The pedometer unit 162 can be typically implemented by an accelerometer sensor, but is not limited to it. The pedometer unit 162 may be implemented by any other appropriate device that can measure the number of user's steps or the walking distance.

The travelling direction measurement unit 164 monitors walking of a user carrying the mobile terminal 100 and detects the travelling direction of the user's walking. The travelling direction measurement unit 164 can be typically implemented by a geomagnetic sensor or a gyro sensor, but is not limited to it. The travelling direction measurement unit 164 may be implemented by any other appropriate device that can measure the travelling direction of the user.

The autonomous navigation measurement unit 160 provides the autonomous navigation calculation unit 180 with the number of user's steps measured by the pedometer measurement unit 162 and the user's travelling direction measured by the travelling direction measurement unit 164 as sensor information. The sensor information may be supplied to the autonomous navigation calculation unit 180 at any appropriate timing such as in response to a request from the autonomous navigation calculation unit 180 or others, in response to start of the user's walking or on a periodic basis.

The autonomous navigation calculation unit 180 acquires the sensor information such as the number of user's steps and the travelling direction of the mobile terminal 100 measured by the autonomous navigation measurement unit 160 and uses the anchor information received from the map application unit 140 to correct the current position of the mobile terminal 100 estimated based on the sensor information.

As illustrated in FIG. 1, the autonomous navigation calculation unit 180 includes a position calculation unit 182, an anchor storage unit 184, a rotation detection unit 186 and a current position correction unit 188.

The position calculation unit 182 calculates a movement amount of the mobile terminal 100 during autonomous navigation based on the sensor information supplied from the autonomous navigation measurement unit 160, determines the current position of the mobile terminal 100 by adding the calculated movement amount to a currently setup reference point and provides the map application unit 140 with the positional information, such as the longitude and the latitude, of the determined current position. Specifically, the position calculation unit 182 uses the measured number of the user's steps and the measured travelling direction in the sensor information to derive the walking distance by multiplying the length of the user's stride (typically, a subtraction of 1 m from the user's input height) with the measured number of steps and calculates the movement amount from the reference point based on the derived walking distance and the measured travelling direction. The position calculation unit 182 initially sets the latitude and the longitude of the departure point of the setup route as the reference point and finds the distance and direction of the movement from the reference point based on the walking distance estimated from the number of the user's steps and the course of travelling direction. Subsequently, whenever the current position correction unit 188 corrects the current position of the mobile terminal 100, the position calculation unit 182 renews the reference point with the post-corrected position and calculates the movement amount from the renewed reference point.

The anchor storage unit 184 stores the anchor information supplied from the map application unit 140. Specifically, the anchor storage unit 184 stores anchor points, anchor areas and other related information from the supplied anchor information and upon requests from other components of the mobile terminal 100, supplies the anchor points and the anchor areas.

Based on change of the travelling direction measured by the travelling direction measurement unit 164, the rotation detection unit 186 detects whether the user of the mobile terminal 100 has rotated. When it is detected that the user has rotated, the rotation detection unit 186 informs the current position correction unit 188 that user's rotation has been detected and provides the current position correction unit 188 with positional information of a rotation point R that may correspond to the directional change point such as a corner on the setup route.

In normal rotation, when a user is turning at a corner, instead of changing the travelling direction momentarily, the user is commonly walking while changing the travelling direction continuously for a certain time period from a start time point to an end time point of the rotation, for example, in such a manner that the user is travelling in an arc around the corner. Accordingly, from the viewpoint of the commonly assumed user's rotation, when the rotation detection unit 186 detects initiation of the rotation, the rotation detection unit 186 is continuously detecting change of the travelling direction from the start time point to the end time point and estimates as the rotation point R the position acquired from the position calculation unit 182 at any appropriate timing from the start time point to the end time point of the rotation, typically the position at the middle time point between the start time point and the end time point (middle rotation point).

Specific operations of the rotation detection operation by the rotation detection unit 186 are described with reference to FIG. 4 in detail below.

Upon receiving the detection of the user's rotation and the positional information of the rotation point R from the rotation detection unit 186, the current position correction unit 188 determines an anchor point corresponding to the rotation point R from anchor points stored in the anchor storage unit 184, updates the position of the rotation point R with the positional information of the determined anchor point and further updates the current position of the mobile terminal 100 corresponding to the updated position of the rotation point R.

Specifically, the current position correction unit 188 calculates the distance between the rotation point R and all the anchor points stored in the anchor storage unit 184, selects the anchor point having the shortest distance of the calculated distance set and determines whether the rotation point R is located within the anchor area of the selected anchor point. If the rotation point R is located within the anchor area, the current position correction unit 188 determines that the user has turned at the corner corresponding to the anchor point and updates the positional information of the rotation point R with the latitude and the longitude of the selected anchor point stored in the anchor storage unit 184. Additionally, the current position correction unit 188 uses differences between the latitude and the longitude of the post-updated rotation point R and the latitude and the longitude of the pre-updated rotation point R to update the latitude and the longitude of the current position calculated by the position calculation unit 182. In this manner, an error of the positional information of the current position calculated by the position calculation unit 182 can be corrected. Specific operations of the position correction operation by the current position correction unit 188 are described with reference to FIG. 5 in detail below.

In the above embodiment, the current position correction unit 188 is configured to calculate the distance between the rotation point R and all the anchor points stored in the anchor storage unit 184. However, the current position correction unit 188 may be configured to calculate the distance between the rotation point R and only a portion of the anchor points stored in the anchor storage unit 184. The portion of anchor points may be one or more anchor points adjacent to the user's previously passing anchor point. If there is a high likelihood that the user walks in line with the setup route, there is a high likelihood that the user may pass the anchor points from the departure point to the destination point in sequence. In this case, it is sufficient to determine whether the user has reached the next anchor point on the setup route, which can reduce calculation. On the other hand, if there is not a high likelihood that the user may walk in line with the setup route, for example, if there are several routes from the user's incoming departure and destination points, the position correction can be made at a higher accuracy by calculating the distance between the rotation point R and all anchor points on the candidate routes in addition to the distance between the rotation points R and all the anchor points on the setup route stored in the anchor storage unit 184.

Figure 2:
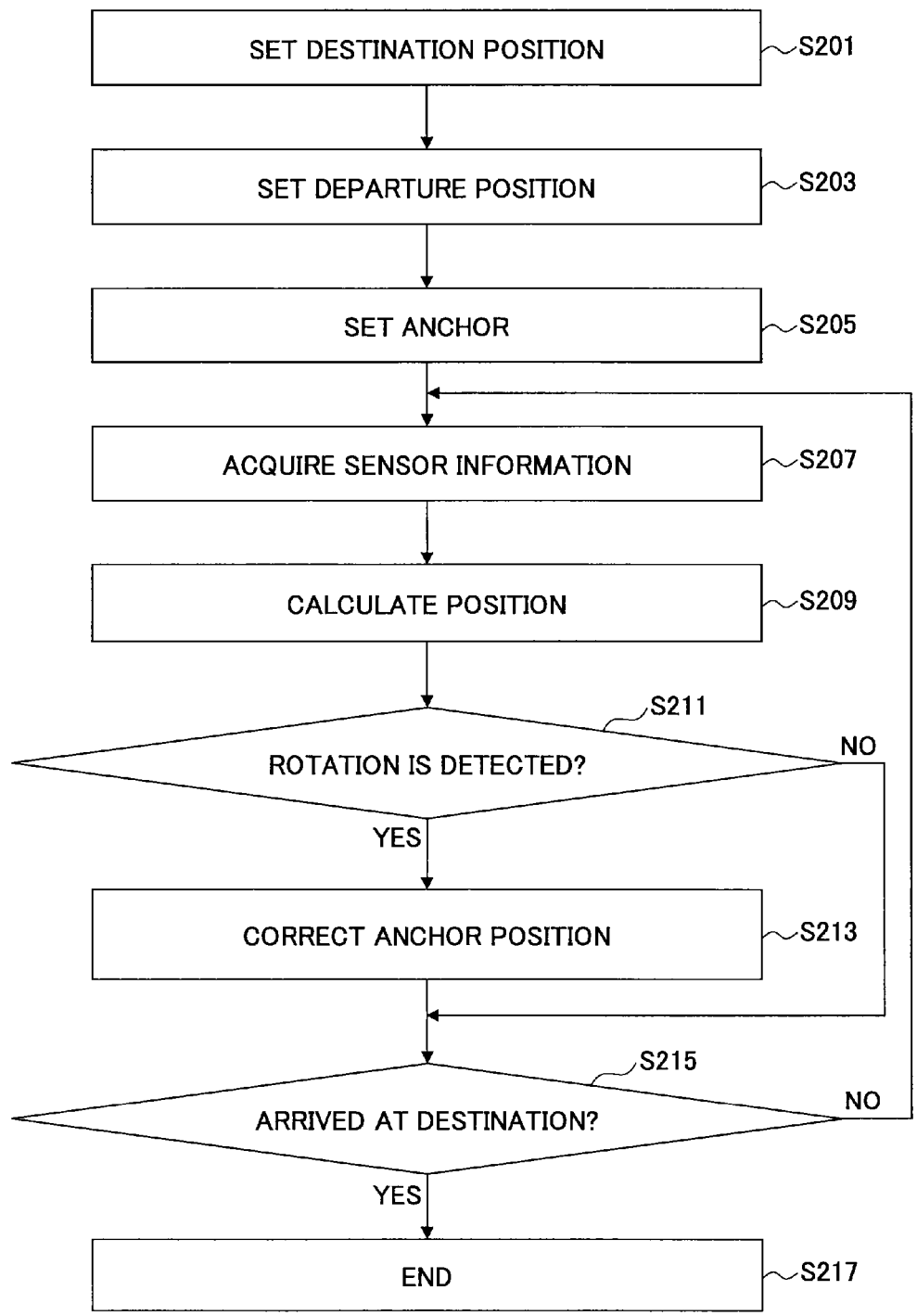
FIG. 2 is a flowchart illustrating an exemplary autonomous navigation operation in a mobile terminal according to one embodiment of the present invention.

Next, an exemplary operation of a mobile terminal according to one embodiment of the present invention is described with reference to FIG. 2. FIG. 2 is a flowchart illustrating an exemplary autonomous navigation operation in a mobile terminal according to one embodiment of the present invention.

As illustrated in FIG. 2, at step S201, a user sets a destination point to the user interface unit 120 via an input device of the mobile terminal 100. As stated above, the user may set the destination point by inputting an address of the destination. Also, the user may set the destination point by specifying a point on map information displayed by the map application unit 140 on a display device of the mobile terminal 100. Also, the user may set the destination point by specifying a building, a facility, a store or others displayed via other applications.

At step S203, the user sets a departure point to the user interface unit 120 via the input device of the mobile terminal 100. Typically, the departure point may be set to the current position by default. On the other hand, the user may set a specific departure point different from the current position via the input device of the mobile terminal 100. For example, the user may set the departure point by inputting an address of the departure point. Also, the user may set the departure point by specifying a point on the map information displayed by the map application unit 140 on a display device of the mobile terminal 100. Also, the user may set the departure point by specifying a building, a facility, a store or others displayed via other applications.

At step S205, the map application unit 140 determines a route for the setup departure and destination points with reference to map information. The map application unit 140 further sets turning or corner points on the determined route as anchor points with reference to the map information. Specific operations of the anchor point setup operation are described in detail below.

At step S207, the autonomous navigation calculation unit 180 acquires sensor information measured by the autonomous navigation measurement unit 160.

At step S209, the autonomous navigation calculation unit 180 calculates the current position of the mobile terminal 100 based on the acquired sensor information.

At step S211, the autonomous navigation calculation unit 180 determines whether the user has rotated. Specific operations of the rotation detection are described in detail below. If it is determined that the user has rotated (S211: YES), the autonomous navigation calculation unit 180 determines the rotation point, and the flow proceeds to step S213. On the other hand, if the rotation of the user has not been detected (S211: NO), the autonomous navigation calculation unit 180 does not perform the anchor position correction, and the flow proceeds to step S215.

At step S213, the autonomous navigation calculation unit 180 selects an anchor point corresponding to the determined rotation point and corrects the current position of the mobile terminal 100 and the rotation point with position information of the selected anchor point. Specific operations of the anchor position correction operation are described in detail below.

At step S215, the autonomous navigation calculation unit 180 determines whether the user has arrived at the destination point based on the current position of the mobile terminal 100. If it is determined that the user has arrived at the destination point (S215: YES), the autonomous navigation operation ends. On the other hand, if the user has not arrived at the destination point (S215: NO), the flow returns to step S207, and the autonomous navigation operation continues.

Figure 3:
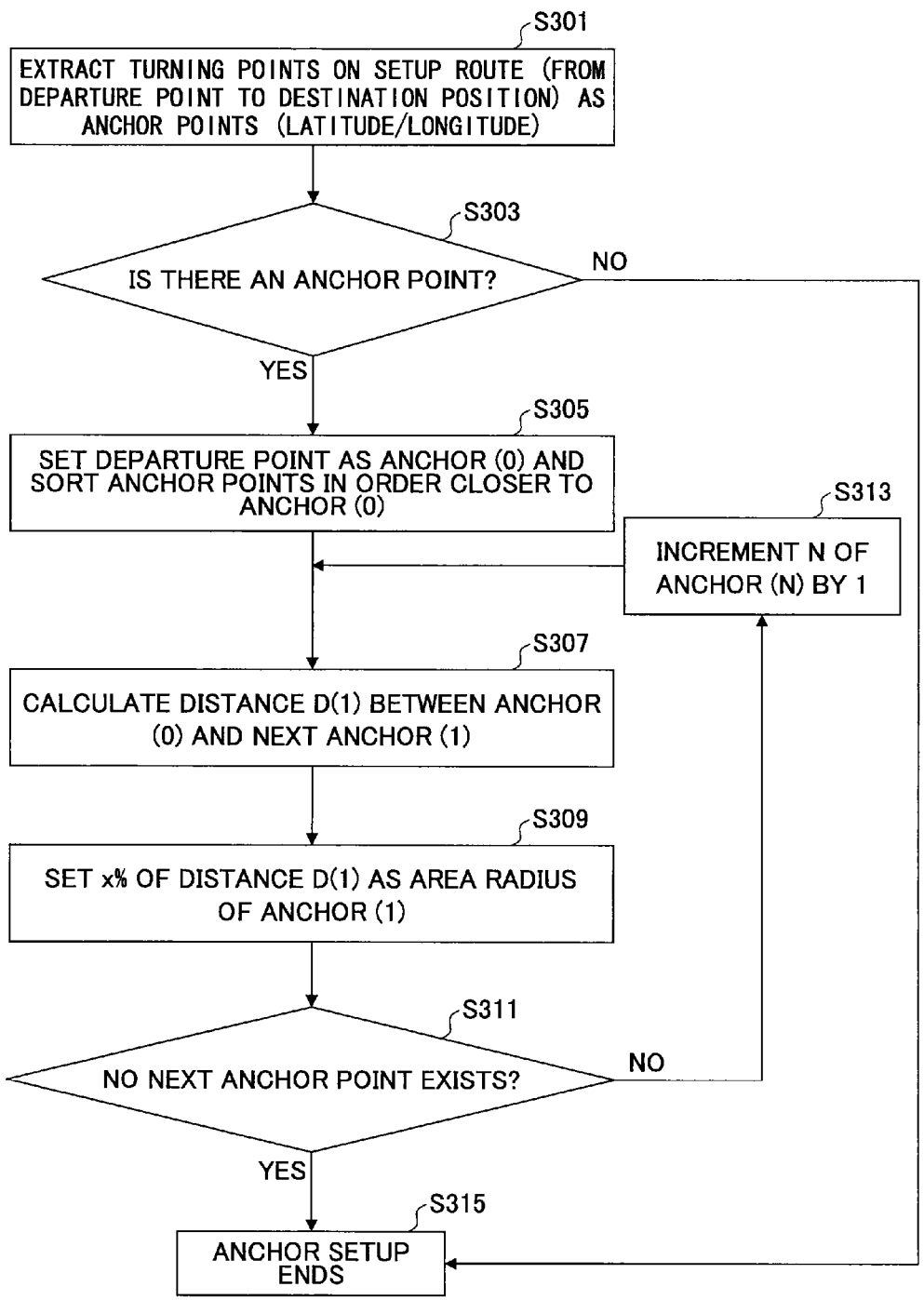
FIG. 3 is a flowchart illustrating an anchor point setup operation according to one embodiment of the present invention.

Next, an anchor point setup operation in the map application unit 140 at step S205 according to one embodiment of the present invention is described with reference to FIG. 3 in detail. FIG. 3 is a flowchart illustrating an anchor point setup operation according to one embodiment of the present invention.

As illustrated in FIG. 3, at step S301, the map display unit 142 determines any appropriate route such as the shortest one of routes from the departure point to the destination point as the setup route for the user's specified departure and destination points and provides the anchor point management unit 144 with the determined setup route. The anchor point management unit 144 extracts corners on the setup route as anchor points with reference to map information.

At step S303, the anchor point management unit 144 determines whether the anchor points corresponding to the corners are present on the setup route. If no anchor route is detected on the setup route (S303: NO), the flow proceeds to step S315, and the anchor point setup operation ends. In this case, the mobile terminal 100 performs the autonomous navigation operation without use of the anchor position correction. On the other hand, if one or more anchor points are detected on the setup route (S303: YES), the flow proceeds to step S305.

At step S305, the anchor point management unit 144 sets the departure point as anchor (0) and sorts one or more detected anchor points in the order of the travelling direction from the departure point to the destination point on the setup route as anchor (1), anchor (2), . . . .

At step S307, for each of the sorted anchors, the anchor point management unit 144 calculates the distance D(N) between adjacent anchor (N−1) and anchor (N). Initially, the anchor point management unit 144 calculates the distance D(1) between anchor (0) and the next anchor (1) with reference to the map information.

At step S309, the anchor point management unit 144 sets an anchor area of anchor (N). The anchor area of anchor (N) is set as an interior portion of a circle having a radius of x % (0<x<100) of the distance D(N) calculated at step S307. The value x may be set to the same value for all the anchor points on the route or to different values for different anchor points. Note that the x value may be preferably set such that mutually adjacent anchor areas do not overlap. This is because the anchor position correction can be inappropriately performed if rotation is detected in overlapped anchor areas.

At step S311, the anchor point management unit 144 determines whether the anchor areas have been set for all the anchor points on the setup route.

Specifically, the anchor point management unit 144 determines whether anchor (N+1) next to the current anchor (N) is not present in the sorted anchor points. If the next anchor (N+1) is present (S311: NO), the flow proceeds to step S313 where counter variable N of anchor (N) is incremented by 1. On the other hand, if the next anchor (N+1) is not present (S311: YES), the flow proceeds to step S315, and the anchor point setup operation ends. Then, the flow proceeds to step S207.

As stated above, according to this embodiment, the anchor area for the anchor point is set based on the distance between the anchor point and the immediately preceding anchor point. However, the present invention is not limited to it, and the anchor area may be set in any other appropriate manner. In another embodiment, the anchor area for the anchor point may be set based on the distance between the anchor point and the immediately succeeding anchor point. Also, the anchor area for the anchor point may be set as an area within a circle having a predefined radius centered at the anchor point.

Next, the rotation detection operation in the rotation detection unit 186 at step S211 according to one embodiment of the present invention is described with reference to FIG. 4 in detail. In this embodiment, as stated above, in commonly assumed user rotation, when a user is turning at a corner, instead of turning the travelling direction momentarily, the user walks while changing the travelling direction continuously for a time period from a start time point to an end time point of the rotation, for example, in such a manner that the user is walking in an arc around the corner. In this case, it must be taken into account which rotation point in the rotation should be used for the anchor position correction. In this embodiment, the rotation point (middle rotation point) at the middle time point from the start time point to the end time point in the rotation is used as the rotation point R for the anchor position correction.

Figure 4:
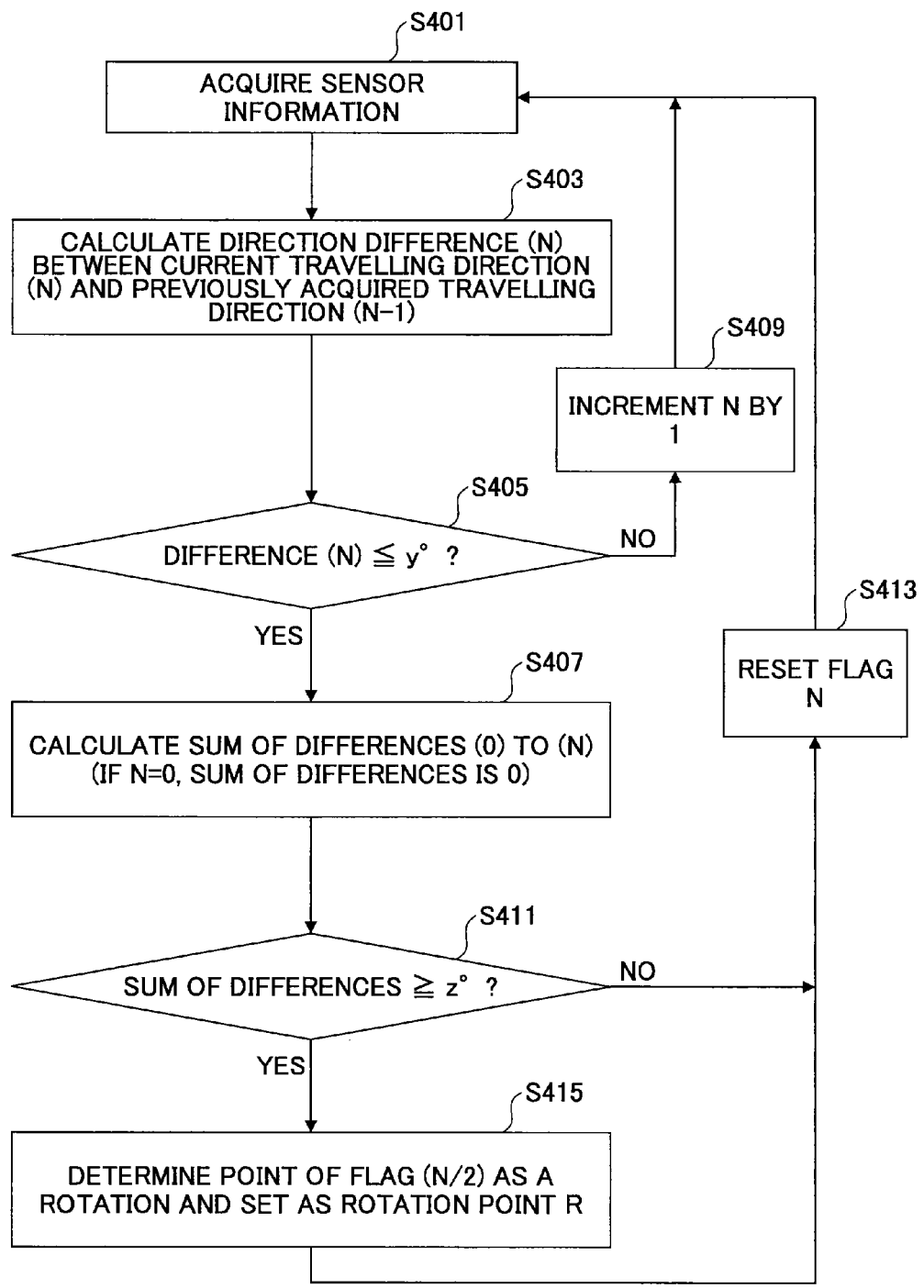
FIG. 4 is a flowchart illustrating a rotation detection operation according to one embodiment of the present invention.

FIG. 4 is a flowchart illustrating a rotation detection operation according to one embodiment of the present invention. As illustrated in FIG. 4, at step S401, the rotation detection unit 186 acquires sensor information from the autonomous navigation measurement unit 160 for the current mobile terminal 100.

At step S403, the rotation detection unit 186 extracts the travelling direction (N) of the current mobile terminal 100 from the acquired sensor information and calculates a directional difference (N) between the extracted travelling direction (N) and the previously acquired travelling direction (N−1). Initially, the time flag N is set to 0.

At step S405, the rotation detection unit 186 determines whether the user is walking almost straight based on the calculated directional difference (N). In other words, the rotation detection unit 186 determines whether the calculated directional difference (N) is less than or equal to a predefined directional change amount y degrees. The directional change degree y is set to a small value from which it can be determined that the user is walking almost straight.

If the directional difference (N) is less than or equal to y degrees, the rotation detection unit 186 determines that the user is walking almost straight, that is, the rotation detection unit 186 determines that the rotation has not been initiated or has been finished. On the other hand, if the directional difference (N) is not less than or equal to y degrees, the rotation detection unit 186 determines that the user has initiated rotation or is rotating.

If the directional difference (N) is greater than y degrees (S405: NO), the flow proceeds to step S409 where the rotation detection unit 186 increments the time flag N by 1. Here, the time parameter is set based on any appropriate time unit such as several milliseconds to several seconds. After incrementing the time flag N, the rotation detection unit 186 acquires the sensor information at the next time point N+1 at step S401 and continues incrementing the time flag N until the user is walking almost straight, in other words, until the user has finished the rotation.

On the other hand, if the directional difference (N) is less than or equal to y degrees (S405: YES), the flow proceeds to step S407 where the rotation detection unit 186 calculates a sum of directional differences (0) to (N) from the initial time point 0 to the current time point N. Note that if N=0, the sum of the directional difference is set to 0.

At step S411, the rotation detection unit 186 determines whether the calculated sum of the directional differences is greater than or equal to a predefined directional change amount z degrees. The directional change degree z is set to a value from which it can be determined that the user has rotated. The z degrees may be set to a constant value or a variable value. For example, if the anchor storage unit 184 stores curved angles for anchor points, that is, directional change angles required to change the direction at the anchor points, the rotation detection unit 186 may access the anchor storage unit 184 to acquire the directional change angle for the next anchor point on the setup route and set the z value depending on the directional change angle. In this manner, the z value can be set depending on characteristics of the anchor point, which can improve accuracy of the rotation detection.

If the sum of the directional differences is less than the z degrees (S411: NO), the rotation detection unit 186 determines that the user has not rotated and at step S413, resets the time flag N to 0, and the flow returns to step S401. It is conceived that the case of the sum of directional differences being less than the z degrees corresponds to the case where the rotation has been detected (S405: NO) but is insufficient due to smallness of the sum of directional differences or the case where the rotation has not been detected (S405: YES) and accordingly the sum of directional differences is small (if the rotation has not been detected, the time flag remains at 0, and the directional difference (0)=0).

On the other hand, if the sum of directional differences is greater than or equal to the z degrees, the rotation detection unit 186 determines that the user has rotated, and at step S415, the point corresponding to the middle time point (N/2) from the start time point 0 to the end time point N in the rotation is set as the rotation point R. Then, the flow proceeds to the anchor position correction operation at step S213.

As stated above, according to this embodiment, the position at the middle time point from the start time point to the end time point in the rotation is set as the rotation point R. However, the present invention is not limited to it, and any other appropriate position maybe set as the rotation point R. In other embodiments, the middle point between the start point and the endpoint in the rotation may be set as the rotation point R. In this case, the rotation detection unit 186 only has to detect the start and end of the rotation, acquire the corresponding start and end points and calculate the middle point between the start point and the end point. In this manner, the rotation point R can beset in simpler operations. In further embodiments, the position at a time point corresponding to the maximum directional difference in directional differences calculated from the start time point to the end time point in the rotation may be set as the rotation point R. This is because the travelling direction may maximally change at a point corresponding to a corner.

Next, the anchor position correction operation by the current position correction unit 188 at step S213 according to one embodiment of the present invention is described with reference to FIG. 5 in detail. FIG. 5 is a flowchart illustrating the anchor position correction operation according to one embodiment of the present invention. In this embodiment, an anchor point corresponding to the detected rotation point R is determined, and the positional information for the rotation point R estimated based on the sensor information is corrected with the positional information of that anchor point possessed by the map application unit 140.

As illustrated in FIG. 5, at step S501, the current position correction unit 188 measures the distance between the rotation point R detected by the rotation detection unit 186 and all the anchor points stored in the anchor storage unit 184.

At step S503, the current position correction unit 188 selects an anchor point (min) of the minimum distance between the measured rotation point R and the anchor points and determines whether the rotation point R is in the anchor area of the selected anchor point (min). If the rotation point R is not in the anchor area of the anchor point (min) (S503: NO), the current position correction unit 188 determines that the user has not rotated at the anchor point, and the flow proceeds to step S509 where the anchor position correction operation ends.

On the other hand, if the rotation point R is in the anchor area of the anchor point (min) (S503: YES), at step S505, the current position correction unit 188 determines that the user has rotated at the anchor point and performs the anchor position correction. In other words, the current position correction unit 188 updates the positional information of the rotation point R such as the latitude and the longitude with the positional information of the anchor point acquired from map information of the map application unit 140.

At step S507, the current position correction unit 188 corrects the current position of the mobile terminal 100 by reflecting the updated amount of the rotation point R to the current position of the mobile terminal 100 estimated based on the sensor information. Upon completion of the correction for the current position, the flow proceeds to step S509 where the anchor position correction operation ends.

As stated above, according to this embodiment, the distance between the rotation point R and all the anchor points stored in the anchor storage unit 184 is calculated. However, the present invention is not limited to it, and any other appropriate method for determining the anchor point corresponding to the rotation point R may be applied. In other embodiments, the distance between the rotation point R and only a portion of the anchor points stored in the anchor storage unit 184 may be calculated. The portion of the anchor points may be one or more anchor points adjacent to the anchor point that the user has passed previously. If there is a high likelihood that the user walks in line with the setup route, there is a high likelihood that the user passes anchor points from the departure point to the destination point in sequence. In this case, it is sufficient to determine whether the user has arrived at the next anchor point on the setup route, which can reduce calculation.

Next, the rotation detection operation by the rotation detection unit 186 at step S211 according to another embodiment of the present invention is described with reference to FIG. 6 in detail. In the embodiment as illustrated in FIG. 4, the rotation point at the middle time point from the start time point to the end time point in the rotation is used as the rotation point R for the anchor position correction. In this embodiment, directional change amounts measured while the user is changing the travelling direction are accumulated. When the cumulative amount exceeds a predefined threshold, it is considered that the rotation has been detected, and the position at that time point is set as the rotation point R.

FIG. 6 is a flowchart illustrating a rotation detection operation according to another embodiment of the present invention. As illustrated in FIG. 6, at step S601, the rotation detection unit 186 acquires sensor information for the current mobile terminal 100 from the autonomous navigation measurement unit 160.

At step S603, the rotation detection unit 186 extracts the travelling direction (N) of the current mobile terminal 100 from the acquired sensor information and calculates directional difference (N) between the extracted travelling direction (N) and the previously acquired travelling direction (N−1). Initially, the time flag N is set to 0.

At step S605, the rotation detection unit 186 determines whether a user is changing the travelling direction based on the calculated directional difference (N). In other words, the rotation detection unit 186 determines whether the calculated directional difference (N) is greater than or equal to a predefined directional change amount y degrees. The directional change degree y is set to a value from which it can be determined that the user is changing the travelling direction.

If the directional difference (N) is greater than or equal to the y degrees, the rotation detection unit 186 determines that the user is changing the travelling direction. On the other hand, if the directional difference (N) is less than the y degrees, the rotation detection unit 186 determines that the user is not changing the travelling direction.

If the directional difference (N) is less than the y degrees (S605: NO), the flow proceeds to step S609 where the rotation detection unit 186 resets the time flag N.

On the other hand, if the directional difference (N) is greater than or equal to the y degrees (S605: YES), the flow proceeds to step S607 where the rotation detection unit 186, calculates the sum of directional differences (0) to (N) from the initial time point 0 to the current time point N. Note that if N=0, the sum of directional differences is set to 0.

At step S611, the rotation detection unit 186 increments the time flag N by 1.

At step S613, the rotation detection unit 186 determines whether the calculated sum of directional differences is greater than or equal to a predefined directional change amount z degrees. The directional change degree z is set to a cumulative value from which it can be determined that the user has rotated by changing the travelling direction continuously. The z degrees may be set to a constant value or a variable value. For example, if the anchor storage unit 184 stores curved angles for anchor points, that is, directional change angles required to change the direction at the anchor points, the rotation detection unit 186 may access the anchor storage unit 184 to acquire the directional change angle for the next anchor point on the setup route and set the z degrees depending on the directional change angle. Accordingly, the z degrees can be set depending on characteristics of the anchor point, which can improve accuracy of the rotation detection.

If the sum of directional differences is less than the z degrees (S613: NO), the rotation detection unit 186 determines that the user is changing the travelling direction but has not rotated yet, and the flow proceeds to step S601.

On the other hand, if the sum of directional differences is greater than or equal to the z degrees, the rotation detection unit 186 determines that the user has rotated, and the flow proceeds to steps S615 and S617. Then, the point corresponding to the time point N when the rotation has been detected is set as the rotation point R, and the flow proceeds to the anchor position correction operation at step S213.

According to this embodiment, when the user changes the travelling direction continuously and the cumulative value of directional change degrees at individual time points exceeds a predefined threshold, it is determined that the user has rotated, and the point corresponding to the determination timing is set to the rotation point R. In this manner, the rotation point can be determined in an operation simpler than the embodiment of FIG. 4.

Although the embodiments of the present invention have been described in detail, the present invention is not limited to the above-stated specific embodiments and can be changed and modified within the scope of the present invention defined in claims.

This international patent application is based on Japanese Priority Application No. 2010-269608 filed on Dec. 2, 2010, the entire contents of which are hereby incorporated by reference.

LIST OF REFERENCE SYMBOLS

100: mobile terminal
120: user interface unit
140: map application unit
160: autonomous navigation measurement unit
180: autonomous navigation calculation unit
182: position calculation unit
184: anchor storage unit
186: rotation detection unit
188: current position correction unit

The invention claimed is:

1. A mobile terminal having an autonomous navigation function, comprising:
   an anchor management unit configured to acquire a directional change point, set the acquired directional change point as an anchor point and store the anchor point, wherein the directional change point is assumed for a user to change direction on a route from a departure point to a destination point of the user of the mobile terminal on map information;
   a measurement unit configured to detect movement of the mobile terminal and provide sensor information indicative of the movement;
   a position calculation unit configured to calculate a current position of the mobile terminal based on the sensor information;
   a rotation detection unit configured to detect rotation of the user based on the sensor information and determine a rotation point associated with the detected rotation; and
   a current position correction unit configured to determine an anchor point corresponding to the determined rotation point from the anchor points stored in the anchor management unit and correct the current position of the mobile terminal with a position of the determined anchor point.

2. The mobile terminal as claimed in claim 1, wherein the directional change point corresponds to a point associated with directional change in the route greater than or equal to a predefined angle.

3. The mobile terminal as claimed in claim 1, wherein the measurement unit includes:
   a pedometer unit configured to detect a number of steps of the user of the mobile terminal; and
   a travelling direction detection unit configured to detect a travelling direction of the mobile terminal, and
   the position calculation unit calculates the current position of the mobile terminal based on the number of steps of the user detected by the pedometer unit and the travelling direction detected by the travelling direction detection unit.

4. The mobile terminal as claimed in claim 3, wherein the rotation detection unit detects the rotation of the user based on a sum of change amounts of the travelling direction detected by the travelling direction detection unit.

5. The mobile terminal as claimed in claim 4, wherein the rotation detection unit
   determines whether the change amounts of the travelling direction detected by the travelling direction detection unit is less than or equal to a predefined first threshold, when the change amounts are not less than or equal to the first threshold, the rotation detection unit estimating that the user is rotating, subsequently upon the change amounts becoming less than or equal to the first threshold, estimating that the user has rotated; and
   determines, when the user has rotated, whether the sum of change amounts during the rotation is greater than or equal to a predefined second threshold, when the sum of change amounts is greater than or equal to the second threshold, the rotation detection unit determining that the user has rotated and determining a point associated with a middle time point between a start time point and an end time point in the rotation as the rotation point.

6. The mobile terminal as claimed in claim 4, wherein the rotation detection unit
   determines whether the change amounts of the travelling direction detected by the travelling direction detection unit are greater than or equal to a predefined third threshold, when the change amounts are greater than or equal to the third threshold, the rotation detection unit estimating that the user is changing the travelling direction; and determines whether the sum of change amounts while the user is changing the travelling direction is greater than or equal to a predefined fourth threshold and determines a point associated with a time point when the sum of change amounts becomes greater than or equal to the fourth threshold as the rotation point.

7. The mobile terminal as claimed in claim 1, wherein the current position correction unit calculates distance between the determined rotation point and the anchor points stored in the anchor management unit and determines an anchor point having the shortest distance as the anchor point corresponding to the determined rotation point.

8. The mobile terminal as claimed in claim 7, wherein for the stored anchor point, the anchor management unit sets a neighboring area centered at the anchor point as an anchor area of the anchor point, and the current position correction unit determines whether the determined rotation point is within the anchor area of the determined corresponding anchor point and if the determined rotation point is within the anchor area of the corresponding anchor point, corrects the current position of the mobile terminal based on a difference between a position of the determined rotation point and a position of the corresponding anchor point.

9. A system comprising:
a mobile terminal having an autonomous navigation function; and
a server communicatively connected to the mobile terminal,
the server comprising:
a route determination unit configured to, upon receiving data indicative of a departure point and a destination point of a user of the mobile terminal, determine a route from the departure point to the destination point with reference to map information; and
an anchor point determination unit configured to extract a directional change point and transmit the extracted directional change point to the mobile terminal, wherein the directional change point is assumed for a user to change direction on the determined route,
the mobile terminal comprising:
an anchor management unit configured to set and store the received directional change point as an anchor point;
a measurement unit configured to detect movement of the mobile terminal and provide sensor information indicative of the movement;
a position calculation unit configured to calculate a current position of the mobile terminal based on the sensor information;
a rotation detection unit configured to detect rotation of the user based on the sensor information and determine a rotation point of the detected rotation; and
a current position correction unit configured to determine an anchor point corresponding to the determined rotation point from the anchor points stored in the anchor management unit and correct the current position of the mobile terminal with a position of the determined anchor point.

10. A method for use in a mobile terminal having an autonomous navigation function, comprising:
acquiring a directional change point, setting the acquired directional change point as an anchor point and storing the anchor point, wherein the directional change point is assumed for a user to change direction on a route from a departure point to a destination point of the user of the mobile terminal on map information;
detecting movement of the mobile terminal and providing sensor information indicative of the movement;
calculating a current position of the mobile terminal based on the sensor information;
detecting rotation of the user based on the sensor information and determining a rotation point associated with the detected rotation; and
determining an anchor point corresponding to the determined rotation point from the stored anchor points and correcting the current position of the mobile terminal with a position of the determined anchor point.

* * * * *

UNITED STATES PATENT AND TRADEMARK OFFICE
CERTIFICATE OF CORRECTION

PATENT NO.        : 8,886,452 B2
APPLICATION NO.   : 13/880086
DATED             : November 11, 2014
INVENTOR(S)       : Makoto Takahashi Page 1 of 1

It is certified that error appears in the above-identified patent and that said Letters Patent is hereby corrected as shown below:

On the title page, Item (73), the Assignee's Information is incorrect. Item (73) should read:

--(73) Assignee: NTT DOCOMO, INC., Tokyo (JP)--

Signed and Sealed this
Seventeenth Day of February, 2015

Michelle K. Lee
*Deputy Director of the United States Patent and Trademark Office*